United States Patent
Frye et al.

(10) Patent No.: US 10,220,729 B2
(45) Date of Patent: Mar. 5, 2019

(54) SEAT POSITION-SENSING SYSTEM

(71) Applicant: Faurecia Automotive Seating, LLC, Auburn Hills, MI (US)

(72) Inventors: Dale J. Frye, West Olive, MI (US); Jeffery T. Bonk, Chesterfield, MI (US); Victoria Urban, Rolla, MO (US); Brendan Laiben, Rolla, MO (US); Christian Teske, Rolla, MO (US); Jake Sternberg, Rolla, MO (US); John Gettermeyer, Rolla, MO (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 69 days.

(21) Appl. No.: 15/274,501

(22) Filed: Sep. 23, 2016

(65) Prior Publication Data
US 2017/0088016 A1  Mar. 30, 2017

Related U.S. Application Data

(60) Provisional application No. 62/232,212, filed on Sep. 24, 2015.

(51) Int. Cl.
*B60N 2/02* (2006.01)
*B60N 2/06* (2006.01)

(52) U.S. Cl.
CPC ........... *B60N 2/0244* (2013.01); *B60N 2/06* (2013.01); *B60N 2002/0272* (2013.01)

(58) Field of Classification Search
CPC .... B60N 2/236; B60N 2/0232; B60N 2/0284; B60N 2/0224; B60N 2/0244; B60N 2/04; B60N 2/06
See application file for complete search history.

(56) References Cited

U.S. PATENT DOCUMENTS

| | | | | |
|---|---|---|---|---|
| 3,550,875 A | * | 12/1970 | Settimi | B60R 22/353 242/382.1 |
| 5,104,084 A | * | 4/1992 | Kumagai | B60N 2/071 248/430 |
| 5,299,853 A | * | 4/1994 | Griswold | B60N 2/233 188/DIG. 1 |
| 5,871,259 A | * | 2/1999 | Gehart | B60N 2/23 297/361.1 |
| 6,788,048 B2 | | 9/2004 | Hedayat | |
| 7,222,919 B2 | | 5/2007 | Uramichi | |

(Continued)

FOREIGN PATENT DOCUMENTS

| | | |
|---|---|---|
| CN | 103182961 B | 7/2015 |
| DE | 10309083 A1 | 9/2004 |

OTHER PUBLICATIONS

International (PCT) Search Report and Written Opinion completed on Jul. 14, 2017 for PCT/US2017/026824, 18 pages.

(Continued)

*Primary Examiner* — Thai Dinh
(74) *Attorney, Agent, or Firm* — Barnes & Thornburg LLP

(57) ABSTRACT

An occupant support for a vehicle includes a vehicle seat and a foundation. The vehicle seat is configured to support an occupant of the vehicle above a floor of the vehicle. The foundation is configured to interconnect the vehicle seat to the floor to permit movement of the vehicle seat relative to the floor along a linear path.

10 Claims, 4 Drawing Sheets

(56) References Cited

U.S. PATENT DOCUMENTS

| | | | |
|---|---|---|---|
| 7,293,752 B2* | 11/2007 | McCulloch | B60N 2/0705 |
| | | | 248/424 |
| 7,330,008 B2 | 2/2008 | Lee | |
| 7,360,838 B2 | 4/2008 | Smuk | |
| 8,285,454 B2 | 10/2012 | Norton | |
| 8,491,054 B2 | 7/2013 | Myers | |
| 8,651,578 B2 | 2/2014 | Yamada | |
| 8,845,027 B2 | 9/2014 | Nock | |
| 9,387,781 B2 | 7/2016 | Matt | |
| 2002/0171280 A1 | 11/2002 | Okazaki | |
| 2004/0217638 A1 | 11/2004 | Shao | |
| 2006/0202537 A1 | 9/2006 | Smuk | |
| 2012/0074750 A1 | 3/2012 | Moriyama | |
| 2012/0205956 A1 | 8/2012 | Nock | |
| 2013/0320735 A1 | 12/2013 | McCulloch | |
| 2014/0152067 A1 | 6/2014 | Pleskot | |
| 2014/0225411 A1 | 8/2014 | Matt | |
| 2016/0023577 A1 | 1/2016 | Yamada | |
| 2016/0023578 A1 | 1/2016 | Tame | |
| 2016/0101710 A1 | 4/2016 | Bonk | |
| 2016/0280098 A1* | 9/2016 | Frye | B60N 2/0228 |

OTHER PUBLICATIONS

Extended European Search Report for European App. No. 17193929.1 established Feb. 26, 2018, 8 pages.

* cited by examiner

SEAT POSITION-SENSING SYSTEM

PRIORITY CLAIM

This application claims priority under 35 U.S.C. § 119(e) to U.S. Provisional Application No. 62/232,212, filed Sep. 24, 2015, which is expressly incorporated by reference herein.

BACKGROUND

The present disclosure relates to a vehicle seat, and particularly to a seat-position sensing system within a vehicle seat. More particularly, the present disclosure relates to a seat-position sensing system used to determine a position of the vehicle seat.

SUMMARY

According to the present disclosure, an occupant support for a vehicle includes a vehicle seat and a foundation. The vehicle seat is configured to support an occupant of the vehicle above a floor of the vehicle. The foundation is configured to interconnect the vehicle seat to the floor to permit movement of the vehicle seat relative to the floor along a linear path.

In illustrative embodiments, the occupant support includes a vehicle seat position-sensing system adapted to determine the position of the vehicle seat along the floor. The vehicle seat position-sensing system includes an input wheel, a rotation translator, and a sensor. The input wheel is configured to rotate as the vehicle seat moves relative to the floor. The translator is configured to provide means for translating an input rotational speed provided by the input wheel to a relatively slower output rotational speed to cause about one output rotation to occur in response to traveling from a beginning to an end of the linear path. The sensor is couple to an output of the translator and configured to sense a rotational position of the output of the translator so that a linear position along the liner path may be determined.

In illustrative embodiments, the translator includes a housing, an output shaft, an inner torsion spring, and an outer torsion spring. The inner torsion spring is coupled on one end to the input wheel and coupled on an opposite end to the output shaft. The outer torsion spring is coupled on one end to the housing and coupled on an opposite end to the output shaft. In use, the input wheel rolls along a stationary portion of the foundation as the vehicle seat moves along the linear path. As a result, the outer torsion spring unwinds and the inner torsion spring winds at the same time. The difference in rated the unwinding and winding causes output shaft to rotate at a different rotational speed than the input wheel.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of an occupant support in accordance with the present disclosure showing that the occupant support includes a vehicle seat for supporting an occupant of a vehicle above a floor of the vehicle, a foundation configured to interconnect the vehicle seat to the floor to permit movement of the vehicle seat relative to the floor along a linear path, and a vehicle seat position-sensing system configured to determine the location of the vehicle seat along the linear path relative to the floor, and showing that the vehicle seat position-sensing system includes an input wheel coupled to a stationary component of the foundation, translator configured to convert rotation of input wheel into a relatively slower output rotation, a sensor coupled to the output of the translator to provide a signal indicative of the position of the vehicle seat along the floor, and a controller coupled to the sensor to receive the signal from the sensor and determine the location of the vehicle seat along the linear path;

FIG. 2 is an enlarged partial perspective view of FIG. 1 showing that the vehicle seat position-sensing system includes a housing coupled to the movable track in a fixed position relative to the movable track, an input wheel arranged to engage the stationary track to cause the input wheel to rotate as the vehicle seat moves along the linear path, and a sensor coupled to an output shaft configured to rotate at a relatively slower rotational speed compared to the input wheel;

FIG. 3 is a view similar to FIG. 2 taken from rear perspective showing the output shaft coupled to the housing to rotate relative to the housing and suggesting that one end of an outer torsion spring is coupled to the housing;

FIG. 4 is a view similar to FIG. 3 with the housing omitted showing that the output shaft is arranged to extend through the inner torsion spring, the inner torsion spring is arranged to extend through the outer torsion spring, the inner torsion spring is coupled on one end to the output shaft and on an opposite end to the input wheel, and suggesting that one end of the outer torsion spring is coupled to the housing and an opposite end of the torsion spring is coupled to the output shaft;

DETAILED DESCRIPTION

Figure 1:
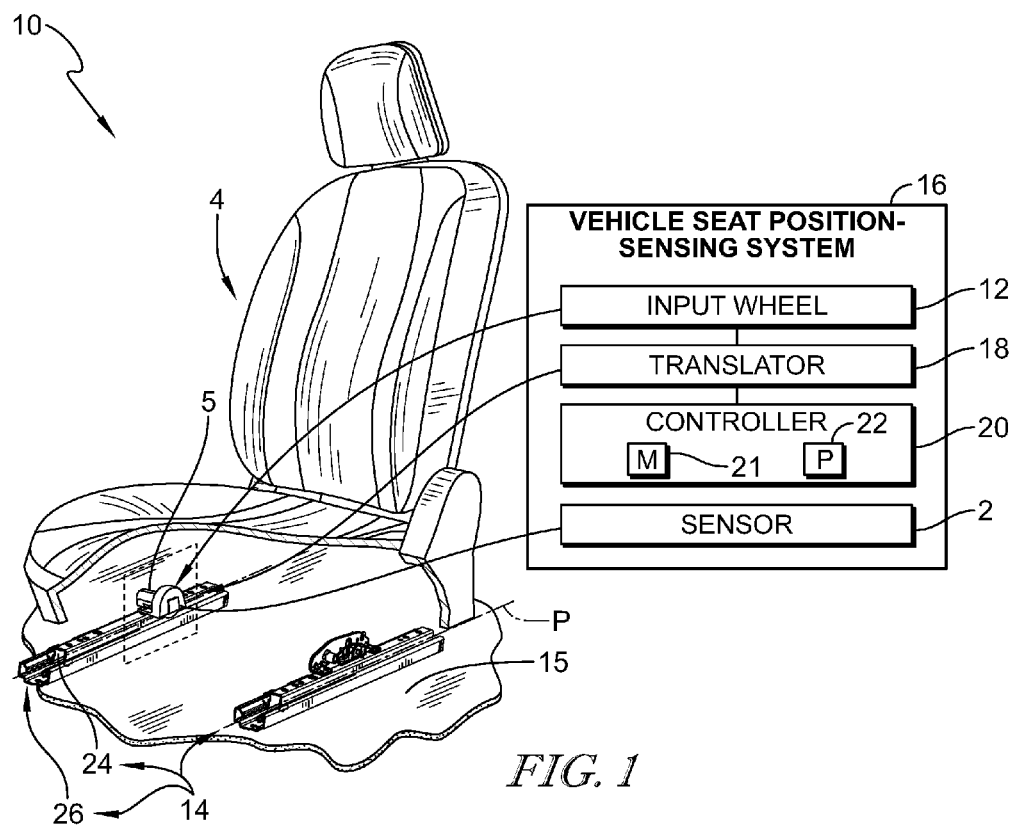

An occupant support 10 configured for use in a passenger vehicle is shown in FIG. 1. Occupant support 10 includes a vehicle seat 4, a foundation 14, and a vehicle seat position-sensing system 16. Vehicle seat 4 is configured to support an occupant of the vehicle about floor 15 of the vehicle. Foundation 14 is configured to interconnect vehicle seat 4 to floor 15 to permit movement of vehicle seat 4 relative to floor 15 along a predetermined linear path. When the occupant is supported by vehicle seat 4, movement of vehicle seat 4 relative to floor 15 along path P adjusts the position of the occupant relative to floor 15 and vehicle seat position-sensing system 16 determines the location of vehicle seat 4 along floor 15.

When an occupant is supported by vehicle seat 4, movement of vehicle seat 4 relative to the floor 15 along longitudinal path P adjusts the position of the occupant relative to the floor 15. Vehicle seat position-sensing system 16 determines the absolute location of the vehicle seat 4 along the floor 15. Vehicle seat position-sensing system 16 is couple to an upper track 24 which slides along a stationary track 26 (also called lower track 26) which is fixed to the vehicle floor 15.

Figure 2:
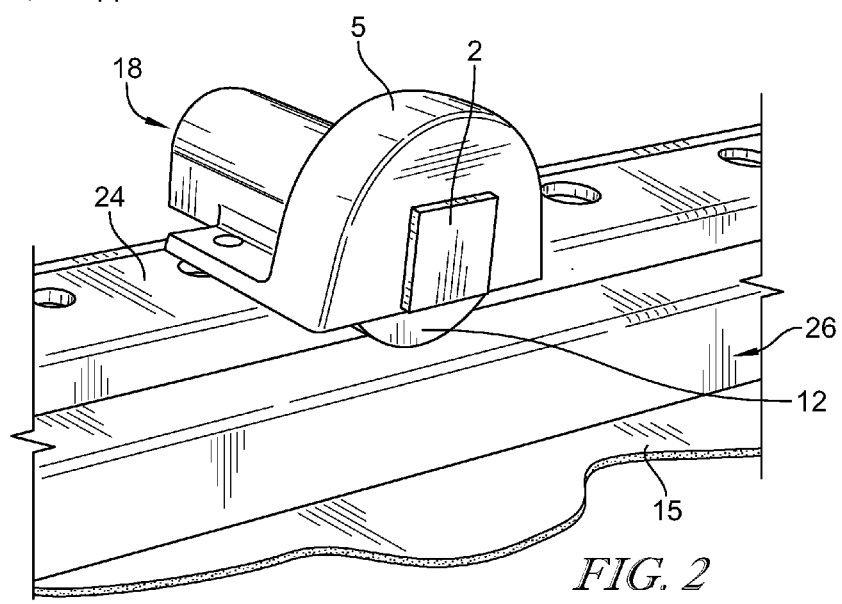
Figure 3:
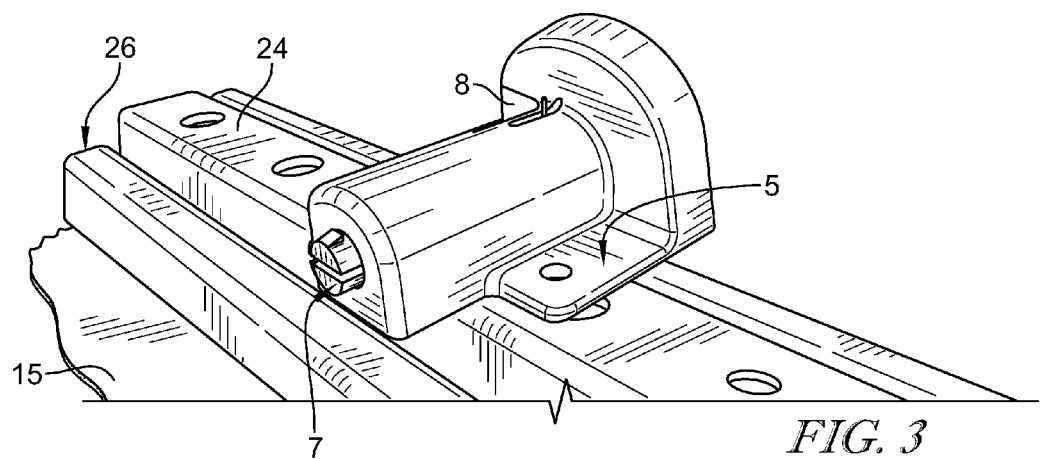
Figure 4:
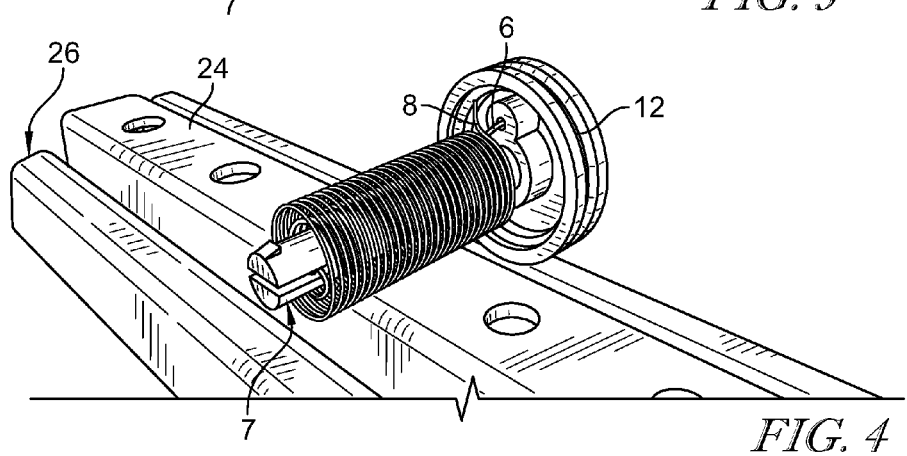
Figure 5:
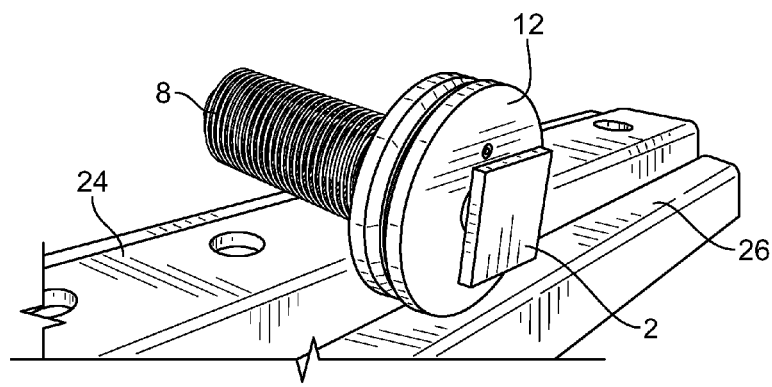
FIG. 5 is a view similar to FIG. 4 taken from a front perspective showing that the accelerometer sensor is coupled to the output shaft and that the output shaft extends through the input wheel to rotate relative to the input wheel.

Vehicle seat position-sensing system 16 includes an input wheel 12, a sensor 2, and a rotation translator 18 as shown in FIGS. 1-3. Input wheel 12 is configured to rotate as the vehicle seat 4 moves relative to the floor 15. Rotation translator 18 is configured to provide means for translating an input rotational speed of the input wheel 12 to a relatively slower output rotational speed to cause about one output rotation to occur in response to traveling from a beginning to an end of the predetermined linear path P. Sensor 2 is coupled to an output of the rotation translator and configured to sense a rotational position of the output of the translator so that a linear position along the liner path may be determined.

Rotation translator 18 includes a housing 5, an output shaft 7, an inner spring 6 and an outer spring 8. Housing 5 is coupled to a movable component 24 of foundation 14 in a fixed position relative to movable component 24. Output shaft 7 is coupled to sensor 2 to rotate therewith. Inner spring 6 is coupled on one end to input wheel 12 and coupled on an opposite end to output shaft 7. Outer spring 8 is coupled on one end to housing 5 and coupled on an opposite end to output shaft 7.

In an illustrative example, inner spring 6 has a first spring constant and outer spring 8 has a second spring constant. In one example, the first spring constant is different than the second spring constant. In another example, the first spring constant is greater than the second spring constant.

Outer torsion spring 8 is arranged to extend along and around output shaft 7. Inner torsion spring 6 is arranged to extend along and around output shaft 7. Inner torsion spring 6 is located between outer torsion spring 8 and output shaft 7.

In one example, sensor 2 is an accelerometer. However, any other suitable sensor may be used. Reference is hereby made to U.S. Patent Publication No. US2016/0101710, filed Oct. 8, 2015, published Apr. 14, 2016, and entitled SEAT POSITION SENSING AND ADJUSTMENT for disclosure relating to accelerometers in vehicle seats, which application is hereby incorporated in its entirety herein.

Controller 20 is coupled to sensor 2, and controller 20 includes memory 21 and processor 22. Memory 21 has instructions stored therein that are executable by processor 22 to cause controller 20 to receive the signal from sensor 2 and determine the location of vehicle seat 4 along linear path P based on the signal from sensor 2.

The outer torsion spring 8 has a different spring rate that inner torsion spring 6 that opposes the winding proportionally to the spring rate differential. The result is a reduction in angular velocity of output shaft 7 as opposed to the input wheel 12. In one example, the input wheel 12 rotates approximately four rotations and the output shaft 7 with the accelerometer 2 rotates less than 360 degrees. In another example, for every ten rotations of input wheel 12, output shaft 7 rotates about once. In one example, a reduction ratio is the ratio of input wheel 12 rotations to output shaft 7 rotations. Any suitable reduction ratio may be used. The reduction ratio may be based on a length of the predetermined path P, diameter of input wheel 12, diameter of output shaft 7, sensitivity of sensor 2, and any other suitable factor.

Figure 6:
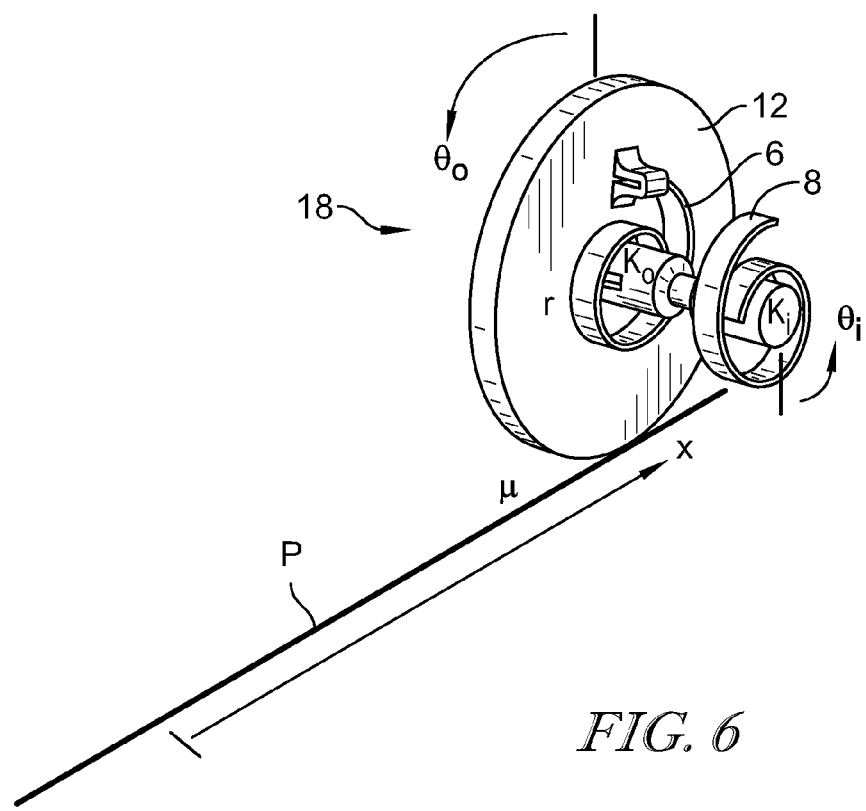
FIG. 6 is a diagrammatic view of the translator of FIGS. 1-4 showing how travel along the linear path is converted to an input angular displacement by rotation of the input wheel and two different torsion springs covert the input angular displacement to a relatively smaller output angular displacement.
Figure 7:
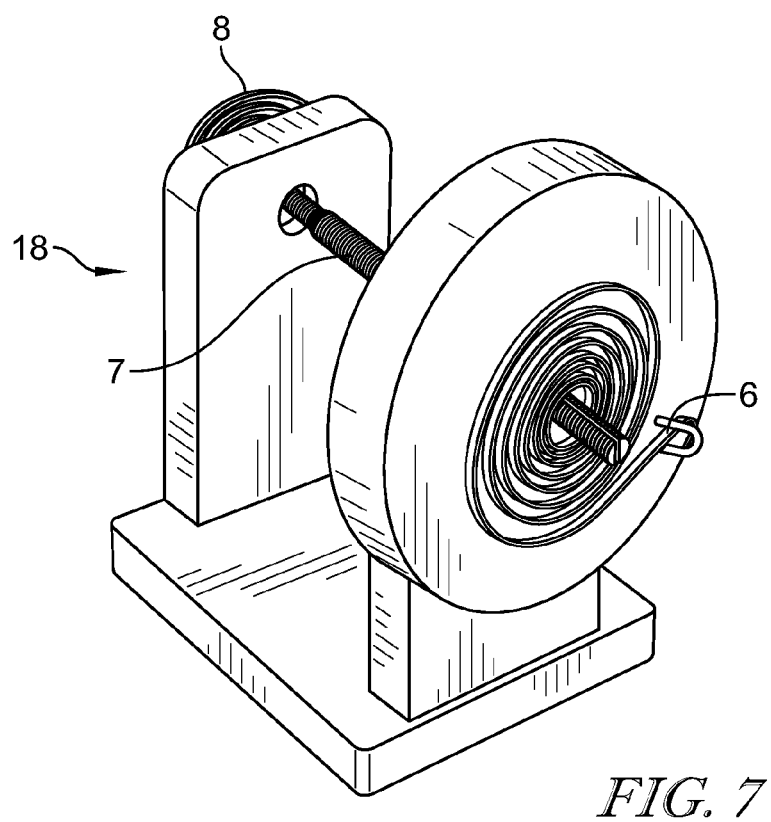
FIG. 7 is a photograph of one embodiment of a translator in accordance with the present disclosure.
Figure 8:
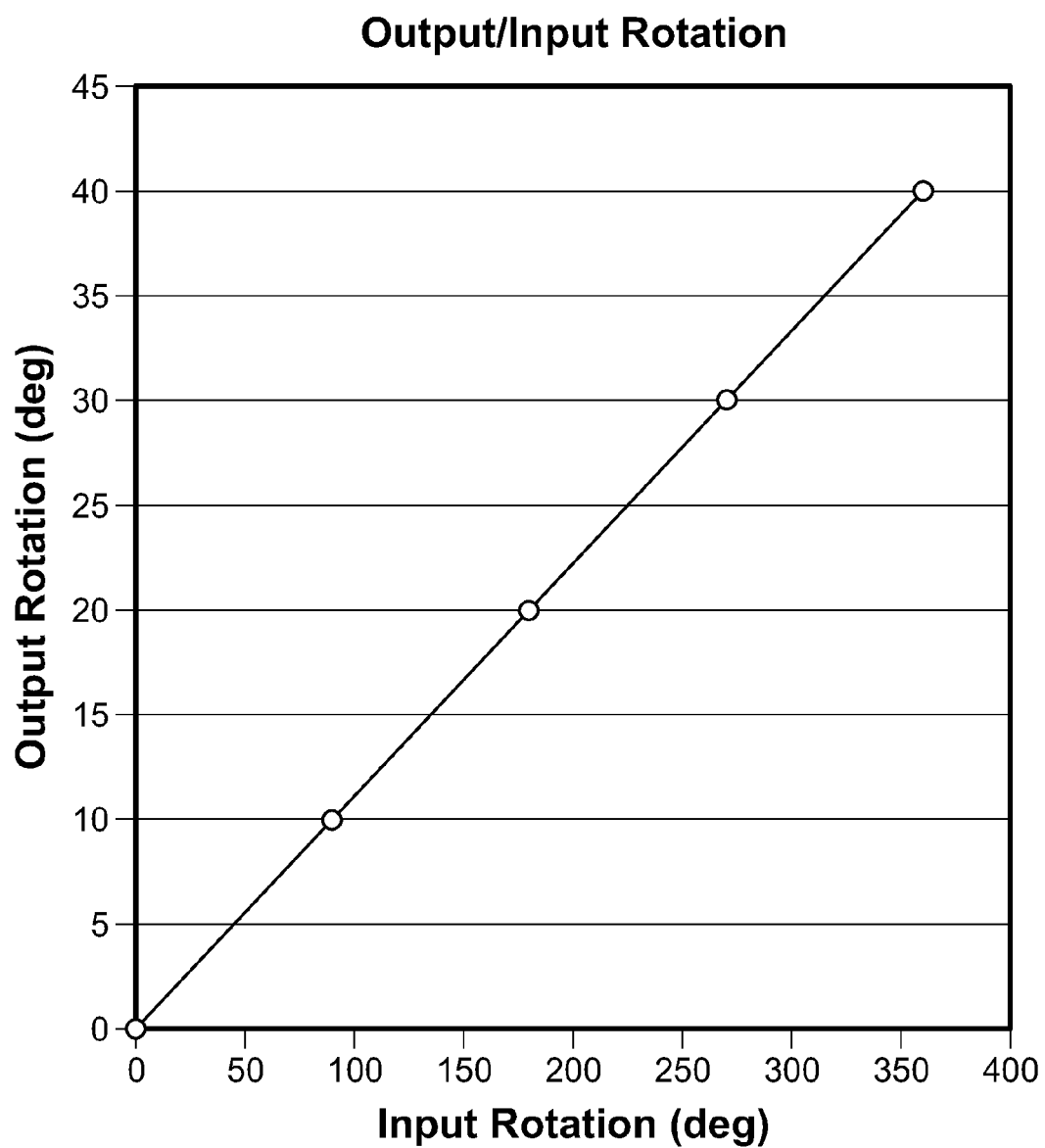
FIG. 8 is a graph showing result of tests carried out using the translator of FIG. 7 showing that input rotational speed is translated to output rotation speed at a rate of about 10 to 1.

As suggested in FIG. 6, C is assumed to be a reduction ratio, x as an input and the $\theta_i$ as an output. The reduction ratio C may be calculated according the following mathematical equations:

$$\theta_i = \theta_i\left(\frac{k_i}{k_0}\right) + \theta_i\left(k_i\frac{L}{JG}\right) = \frac{x}{r} \times \frac{180}{\pi} \qquad \text{Equation-1}$$

$$\theta_i = \left[\frac{\frac{180}{\pi}}{1 + \left(\frac{k_i}{k_o}\right) + \left(\frac{k_iL}{JG}\right)}\right]x = Cx \qquad \text{Equation-2}$$

Where:
J→Second polar moment of inertia
G→Flexural modulus of the shaft
L→Distance between springs
$k_i, k_o$→Inner an outer Spring Constant, respectively
$\theta_i, \theta_o$→Rotation of inner and outer spring, respectively The input wheel 12 rolls along the stationary track 26. As a result, the two counter wound torsion springs 6, 8 react upon each other causing the output shaft 7 with the accelerometer 2 to rotate at slower rate than the input wheel 12.

An occupant support for a vehicle, the occupant support comprising a translator, an inner torsion spring, an input transmission mechanism, an output shaft, an outer torsion spring, and a vehicle seat that moves along a linear path relative to a floor of the vehicle, wherein one of the torsion springs unwinds in a first direction and the other of the torsion springs winds in a second direction, the second direction being different relative to the first direction, in which winding and unwinding occurs simultaneously for both springs, in which the difference in the rate of unwinding and winding causes the output shaft to rotate at a different rotational speed than the input transmission mechanism.

In one example, the translator may include the output shaft, the inner torsion spring, and the outer torsion spring located in a space formed in a single housing.

In one example, at least one of the outer torsion spring and the inner torsion spring is coupled on one end to an input mechanism and coupled on an opposite end to the output shaft. At least one of the outer torsion spring and the inner torsion spring is adapted to wind in a first clockwise direction.

In one example, the outer torsion spring is coupled on one end to the housing and coupled on an opposite end to the output shaft. The outer torsion spring is adapted to unwind in a second counter-clockwise direction.

In one example, the other of the at least one of the outer torsion spring and the inner torsion spring is coupled on one end to the housing and coupled on an opposite end of the output shaft.

In one example, the input mechanism translates along a stationary portion of the floor of the vehicle as the vehicle moves along the linear path. In one example, the input mechanism is an input wheel. In another example, the input mechanism is a non-circular frame or disk arranged to revolve on an eccentric axis. In another example, the input mechanism is a semi-circular frame or disk arranged to revolve on a circumcentral axis. In another example, the input mechanism is a semi-circular frame or disk arranged to revolve on an eccentric axis.

The invention claimed is:

1. An occupant support for a vehicle, the occupant support comprising
    an inner torsion spring,
    an input transmission mechanism,
    an output shaft,
    an outer torsion spring, and
    a vehicle seat that moves along a linear path relative to a floor of the vehicle,
    wherein one of the outer torsion spring and inner torsion spring unwinds in a first direction and the other of the outer torsion spring and inner torsion spring winds in a second direction, the second direction being different than the first direction, the winding and the unwinding occur at the same time for both the outer torsion spring and inner torsion spring, and a difference between a rate of winding and a rate of unwinding causes the output shaft to rotate at a different rotational speed than the input transmission mechanism.

2. The occupant support of claim 1, wherein the output shaft, the inner torsion spring, and the outer torsion spring are located in a space formed in a single housing.

3. The occupant support of claim 2, wherein at least one of the outer torsion spring and the inner torsion spring is coupled on one end to an input mechanism and coupled on an opposite end to the output shaft and at least one of the outer torsion spring and the inner torsion spring is configured to wind in a first clockwise direction.

4. The occupant support of claim 2, wherein the outer torsion spring is coupled on one end to the housing and coupled on an opposite end to the output shaft, the outer torsion spring is configured to unwind in a second counter-clockwise direction.

5. The occupant support of claim 2, wherein the other of the at least one of the outer torsion spring and the inner torsion spring is coupled on one end to the housing and coupled on an opposite end of the output shaft.

6. The occupant support of claim 2, wherein the input mechanism moves relative to the floor of the vehicle as the vehicle seat moves along the linear path.

7. The occupant support of claim 6, wherein the input mechanism is an input wheel.

8. The occupant support of claim 6, wherein the input mechanism is a non-circular frame or disk arranged to revolve on an eccentric axis.

9. The occupant support of claim 6, wherein the input mechanism is a semi-circular frame or disk arranged to revolve on a circumcentral axis.

10. The occupant support of claim 6, wherein the input mechanism is a semi-circular frame or disk arranged to revolve on an eccentric axis.

* * * * *